(12) United States Patent
Wasserblat et al.

(10) Patent No.: US 9,311,914 B2
(45) Date of Patent: Apr. 12, 2016

(54) METHOD AND APPARATUS FOR ENHANCED PHONETIC INDEXING AND SEARCH

(75) Inventors: Moshe Wasserblat, Makabim (IL); Dan Eylon, Ramat Hasharon (IL); Tzach Ashkenazi, Petach-Tikva (IL); Oren Pereg, Amikam (IL); Ronen Laperdon, Modi'in (IL)

(73) Assignee: NICE-SYSTEMS LTD, Ra'Anana (IL)

( * ) Notice: Subject to any disclaimer, the term of this patent is extended or adjusted under 35 U.S.C. 154(b) by 430 days.

(21) Appl. No.: 13/602,214

(22) Filed: Sep. 3, 2012

(65) Prior Publication Data
US 2014/0067373 A1    Mar. 6, 2014

(51) Int. Cl.
| | |
|---|---|
| *G10L 13/08* | (2013.01) |
| *G10L 19/02* | (2013.01) |
| *G10L 19/12* | (2013.01) |
| *G10L 15/08* | (2006.01) |
| *G10L 15/22* | (2006.01) |
| *G10L 15/187* | (2013.01) |
| *G10L 15/26* | (2006.01) |
| *G10L 15/20* | (2006.01) |
| *G10L 15/02* | (2006.01) |
| *G10L 15/10* | (2006.01) |
| *G06F 17/30* | (2006.01) |
| *G06F 17/27* | (2006.01) |
| *G06Q 10/10* | (2012.01) |
| *G10L 15/04* | (2013.01) |

(52) U.S. Cl.
CPC ............... *G10L 15/02* (2013.01); *G10L 15/04* (2013.01); *G10L 2015/025* (2013.01)

(58) Field of Classification Search
CPC ..... G10L 13/08; G10L 19/0212; G10L 19/12; G10L 15/08; G10L 15/22; G10L 15/187; G10L 15/265; G10L 15/20; G10L 15/02; G10L 15/10; G06F 17/274; G06F 17/30864; G06F 17/30985; G06Q 10/107; G06Q 10/10
USPC .......... 707/741, 706, 780, 803, 769; 704/235, 704/238, 230, 260, 3, 254, 220, 231, 255, 704/251, 243, 234, 236, 270, 240; 715/753
See application file for complete search history.

(56) References Cited

U.S. PATENT DOCUMENTS

| | | | | |
|---|---|---|---|---|
| 5,349,645 | A * | 9/1994 | Zhao ..................... | G10L 15/142 704/243 |
| 5,500,920 | A * | 3/1996 | Kupiec ................... | G10L 15/22 704/270.1 |
| 5,621,859 | A * | 4/1997 | Schwartz .............. | G10L 15/142 704/256 |
| 5,963,899 | A * | 10/1999 | Bayya ................. | G10L 21/0208 704/226 |
| 6,012,053 | A * | 1/2000 | Pant ................... | G06F 17/30696 |
| 6,026,398 | A * | 2/2000 | Brown et al. ................. | 707/745 |
| 6,108,628 | A * | 8/2000 | Komori ................. | G10L 15/142 704/238 |

(Continued)

FOREIGN PATENT DOCUMENTS

KR    1020060020754    * 10/2007

*Primary Examiner* — Paras D Shah
*Assistant Examiner* — Anne Thomas-Homescu
(74) *Attorney, Agent, or Firm* — Soroker-Agmon

(57) ABSTRACT

The subject matter discloses a method two phase phonetic indexing and search comprising: receiving a digital representation of an audio signal; producing a phonetic index of the audio signal; producing phonetic N-gram sequence from the phonetic index by segmenting the phonetic index into a plurality of phonetic N-grams; and producing an inverted index of the plurality of phonetic N-grams.

16 Claims, 5 Drawing Sheets

(56) References Cited

U.S. PATENT DOCUMENTS

| | | | | |
|---|---|---|---|---|
| 6,122,613 A * | 9/2000 | Baker | G10L 15/22 | |
| | | | 704/235 | |
| 6,178,401 B1 * | 1/2001 | Franz et al. | 704/255 | |
| 6,243,713 B1 * | 6/2001 | Nelson | G06F 17/30017 | |
| 6,253,178 B1 * | 6/2001 | Robillard et al. | 704/238 | |
| 6,266,636 B1 * | 7/2001 | Kosaka et al. | 704/244 | |
| 6,539,353 B1 * | 3/2003 | Jiang | G10L 15/142 | |
| | | | 704/252 | |
| 6,681,206 B1 * | 1/2004 | Gorin et al. | 704/243 | |
| 6,789,061 B1 * | 9/2004 | Fischer | G10L 15/144 | |
| | | | 704/231 | |
| 6,882,970 B1 * | 4/2005 | Garner et al. | 704/236 | |
| 7,139,712 B1 * | 11/2006 | Yamada | G10L 13/07 | |
| | | | 704/266 | |
| 7,212,968 B1 * | 5/2007 | Garner et al. | 704/251 | |
| 7,263,484 B1 * | 8/2007 | Cardillo | G06F 17/30681 | |
| | | | 704/231 | |
| 7,286,984 B1 * | 10/2007 | Gorin et al. | 704/254 | |
| 7,310,600 B1 * | 12/2007 | Garner et al. | 704/234 | |
| 7,818,170 B2 * | 10/2010 | Cheng | G06F 17/30026 | |
| | | | 704/249 | |
| 7,962,330 B2 * | 6/2011 | Goronzy | G10L 25/00 | |
| | | | 700/94 | |
| 8,438,089 B1 * | 5/2013 | Wasserblat | G06Q 40/02 | |
| | | | 704/270 | |
| 8,543,399 B2 * | 9/2013 | Jeong et al. | 704/240 | |
| 8,762,142 B2 * | 6/2014 | Jeong et al. | 704/232 | |
| 8,838,446 B2 * | 9/2014 | Jeong et al. | 704/232 | |
| 2002/0052740 A1 * | 5/2002 | Charlesworth et al. | 704/220 | |
| 2002/0052870 A1 * | 5/2002 | Charlesworth et al. | 707/3 | |
| 2002/0156776 A1 * | 10/2002 | Davallou | G06F 17/3061 | |
| 2003/0187642 A1 * | 10/2003 | Ponceleon et al. | 704/252 | |
| 2003/0204399 A1 * | 10/2003 | Wolf et al. | 704/251 | |
| 2003/0204492 A1 * | 10/2003 | Wolf et al. | 707/3 | |
| 2005/0049872 A1 * | 3/2005 | Dharanipragada | G10L 15/02 | |
| | | | 704/256 | |
| 2006/0074892 A1 * | 4/2006 | Davallou | G06F 17/3061 | |
| 2006/0136218 A1 * | 6/2006 | Lee | G10L 15/285 | |
| | | | 704/270.1 | |
| 2006/0206324 A1 * | 9/2006 | Skilling et al. | 704/231 | |
| 2007/0038450 A1 * | 2/2007 | Josifovski | 704/255 | |
| 2007/0225981 A1 * | 9/2007 | Kim | G10L 15/04 | |
| | | | 704/240 | |
| 2008/0059188 A1 * | 3/2008 | Konopka | G10L 15/22 | |
| | | | 704/257 | |
| 2008/0071542 A1 * | 3/2008 | Yu | 704/270 | |
| 2008/0082329 A1 * | 4/2008 | Watson | 704/235 | |
| 2008/0082341 A1 * | 4/2008 | Blair | G10L 15/08 | |
| | | | 704/275 | |
| 2008/0097982 A1 * | 4/2008 | Gupta | G06F 17/30864 | |
| 2008/0130699 A1 * | 6/2008 | Ma et al. | 372/50.12 | |
| 2008/0162125 A1 * | 7/2008 | Ma | G06F 17/30746 | |
| | | | 704/222 | |
| 2008/0167872 A1 * | 7/2008 | Okimoto et al. | 704/251 | |
| 2008/0172224 A1 * | 7/2008 | Liu et al. | 704/220 | |
| 2008/0201136 A1 * | 8/2008 | Fujimura | G10L 15/32 | |
| | | | 704/201 | |
| 2008/0228296 A1 * | 9/2008 | Eilam et al. | 700/94 | |
| 2008/0256033 A1 * | 10/2008 | Cheng | 707/3 | |
| 2008/0267503 A1 * | 10/2008 | Denoue et al. | 382/177 | |
| 2008/0270110 A1 * | 10/2008 | Yurick et al. | 704/3 | |
| 2008/0270138 A1 * | 10/2008 | Knight et al. | 704/260 | |
| 2008/0270344 A1 * | 10/2008 | Yurick et al. | 707/2 | |
| 2009/0006075 A1 * | 1/2009 | Krishnan et al. | 704/2 | |
| 2009/0030680 A1 * | 1/2009 | Mamou | 704/235 | |
| 2009/0030894 A1 * | 1/2009 | Mamou et al. | 707/5 | |
| 2009/0043575 A1 * | 2/2009 | Thompson et al. | 704/230 | |
| 2009/0043581 A1 * | 2/2009 | Abbott et al. | 704/254 | |
| 2009/0055206 A1 * | 2/2009 | Orbke | 705/1 | |
| 2009/0055360 A1 * | 2/2009 | Morris | G06F 17/30749 | |
| 2009/0063151 A1 * | 3/2009 | Arrowood et al. | 704/254 | |
| 2009/0070299 A1 * | 3/2009 | Parikh et al. | 707/3 | |
| 2009/0150152 A1 * | 6/2009 | Wasserblat et al. | 704/254 | |
| 2009/0157403 A1 * | 6/2009 | Chung | G10L 15/187 | |
| | | | 704/254 | |
| 2009/0164218 A1 * | 6/2009 | Ma | 704/254 | |
| 2009/0210226 A1 * | 8/2009 | Ma | 704/236 | |
| 2009/0234826 A1 * | 9/2009 | Bidlack | G06F 17/30489 | |
| 2009/0292541 A1 * | 11/2009 | Daya | G10L 15/063 | |
| | | | 704/251 | |
| 2010/0005056 A1 * | 1/2010 | Bayliss | G06F 17/30303 | |
| | | | 707/E17.005 | |
| 2010/0179811 A1 * | 7/2010 | Gupta et al. | 704/235 | |
| 2010/0223056 A1 * | 9/2010 | Kadirkamanathan | 704/235 | |
| 2010/0250620 A1 * | 9/2010 | Maier et al. | 707/803 | |
| 2010/0306193 A1 * | 12/2010 | Pereira | G06F 17/30784 | |
| | | | 707/728 | |
| 2010/0312782 A1 * | 12/2010 | Li et al. | 707/769 | |
| 2010/0324900 A1 * | 12/2010 | Faifkov | G10L 15/12 | |
| | | | 704/254 | |
| 2011/0004473 A1 * | 1/2011 | Laperdon et al. | 704/243 | |
| 2011/0037766 A1 * | 2/2011 | Judy et al. | 345/440 | |
| 2011/0066629 A1 * | 3/2011 | Escalante | G06F 17/30864 | |
| | | | 707/765 | |
| 2011/0145214 A1 * | 6/2011 | Zhang et al. | 707/706 | |
| 2011/0206198 A1 * | 8/2011 | Freedman et al. | 379/265.03 | |
| 2011/0224983 A1 * | 9/2011 | Moore | 704/240 | |
| 2011/0295605 A1 * | 12/2011 | Lin | 704/251 | |
| 2011/0307257 A1 * | 12/2011 | Pereg | G06Q 10/063 | |
| | | | 704/251 | |
| 2012/0036159 A1 * | 2/2012 | Katsurada et al. | 707/780 | |
| 2012/0059656 A1 * | 3/2012 | Garland | G10L 25/00 | |
| | | | 704/254 | |
| 2012/0116766 A1 * | 5/2012 | Wasserblat et al. | 704/254 | |
| 2012/0117076 A1 * | 5/2012 | Austermann | 704/741 | |
| 2012/0143600 A1 * | 6/2012 | Iriyama | G10L 13/08 | |
| | | | 704/207 | |
| 2012/0324538 A1 * | 12/2012 | Malegaonkar et al. | 726/4 | |
| 2013/0018967 A1 * | 1/2013 | Gannu et al. | 709/206 | |
| 2013/0073534 A1 * | 3/2013 | French | 707/706 | |
| 2013/0111355 A1 * | 5/2013 | Jennings | 715/753 | |
| 2013/0246064 A1 * | 9/2013 | Wasserblat | G10L 25/78 | |
| | | | 704/244 | |
| 2013/0262106 A1 * | 10/2013 | Hurvitz et al. | 704/235 | |
| 2013/0289993 A1 * | 10/2013 | Rao | 704/251 | |
| 2014/0025376 A1 * | 1/2014 | Wasserblat et al. | 704/238 | |

* cited by examiner

| PHONETIC N-GRAM 420 | AUDIO SIGNAL ID, TIME TAG [ms], ORDINAL POSITION 430 | AUDIO SIGNAL ID, TIME TAG [ms], ORDINAL POSITION 440 | AUDIO SIGNAL ID, TIME TAG [ms], ORDINAL POSITION 450 |
|---|---|---|---|
| (PH5,PH2,PH8) 422 | 101,1500,3 432 | 131,23850,48 442 | 155,17430,23 452 |
| (PH1,PH6,PH13) 424 | 101,2150,4 434 | 125,32600,64 444 | 454 |
| (PH23,PH16,PH7) 426 | 101,2450,5 436 | 446 | 456 |
| (PH34,PH9,PH17) 428 | 101,2880,6 438 | 109,48500,85 448 | 153,29760,41 458 | ized environment in which the disclosed method is used, according to exemplary embodiments of the disclosed subject matter. As shown, a system 100 may include a capturing and/or logging module 132 that may receive input from various sources as shown by a telephone/VoIP module 112, a walk-in center 116, a video conference 124 or additional sources 128. It will be understood that a capturing and logging module 132 may receive any digital representation of audio signal produced by any component or system, e.g., any recording or capturing device. For example, any one of a microphone, a computer telephony integration (CTI) system, a private branch exchange (PBX), a private automatic branch

METHOD AND APPARATUS FOR ENHANCED PHONETIC INDEXING AND SEARCH

FIELD OF THE INVENTION

The present invention relates to speech recognition in general, and to method and apparatus enhanced phonetic search, in particular.

BACKGROUND

Many organizations, such as commercial organizations, financial institutions, government agencies or public safety organizations conduct numerous interactions with customers, users, suppliers and the like on a daily basis. Many of these interactions are vocal, or at least comprise a vocal or audio component, for example, voices of participants of a phone call or the audio portion of a video or face-to-face interaction.

Many organizations record some or all of the interactions, whether it is required by law or regulations, for quality assurance or quality management purposes, or for any other reason.

Once the interactions are recorded, the organization may want to extract as much information as possible from the interactions. A common usage for such recorded interactions relates to speech recognition and in particular to searching for particular words pronounced by either side of the interaction, such as product or service name, a competitor name, competing product name, or the like.

Searching for words can be performed by phonetic indexing of the interaction's audio signal and then searching the index for words. The search speed of a single indexed interaction is quite fast, but when dealing with large amounts of indexed interactions the accumulative search speed may be very slow in terms of user response time. There is thus a need in the art for a method and apparatus for enhanced phonetic indexing and search, in order to enhance the speed of speech search systems that are based phonetic indexing and search algorithms.

SUMMARY OF THE INVENTION

Searching for words in a large amount of recorded audio signals by using traditional phonetic indexing and search may result in a very slow accumulative search speed in terms of user response time. Search speed in traditional phonetic search systems is a linear function of the number of indexes that are being searched.

An aspect of an embodiment of the disclosed subject matter, relates to a system and method for improving the phonetic search speed, thus enabling fast search speed, in terms of user response time. The search speed improvement is based on splitting the search task into two phases. The first search phase is a fast coarse search and the second phase is a slow fine search. The coarse search is based on inverted phonetic indexing and search. The fine search is based on traditional phonetic indexing and search. The method comprising: receiving a digital representation of an audio signal; producing a phonetic index of the audio signal; producing phonetic N-gram sequence from the phonetic index by segmenting the phonetic index into a plurality of phonetic N-grams; and producing an inverted index of the plurality of phonetic N-grams.

The method can further comprise: obtaining a textual search term; converting the textual search term into a phonetic search term; searching the phonetic search term on the inverted index. The method can further comprise ranking two or more digital audio signals based on the searching of the inverted index and determining whether to perform a second search phase, on the audio signals, based on the audio signals determined rank. In some embodiments only audio signals that have a rank that is higher than a predefined threshold, will be searched by the second search phase. In some embodiments the determination regarding performing the second search phase may be based on the accuracy estimation of the inverted index search. In some embodiments the determination regarding performing the second search phase may be based on other parameters, such as the load balance of a device performing the phonetic search.

By using this method, the search speed, in terms of user response time, of searching for words in a large amount of recorded audio signals is enhanced significantly. Additionally the system provides control over the tradeoff between search speed and search accuracy.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
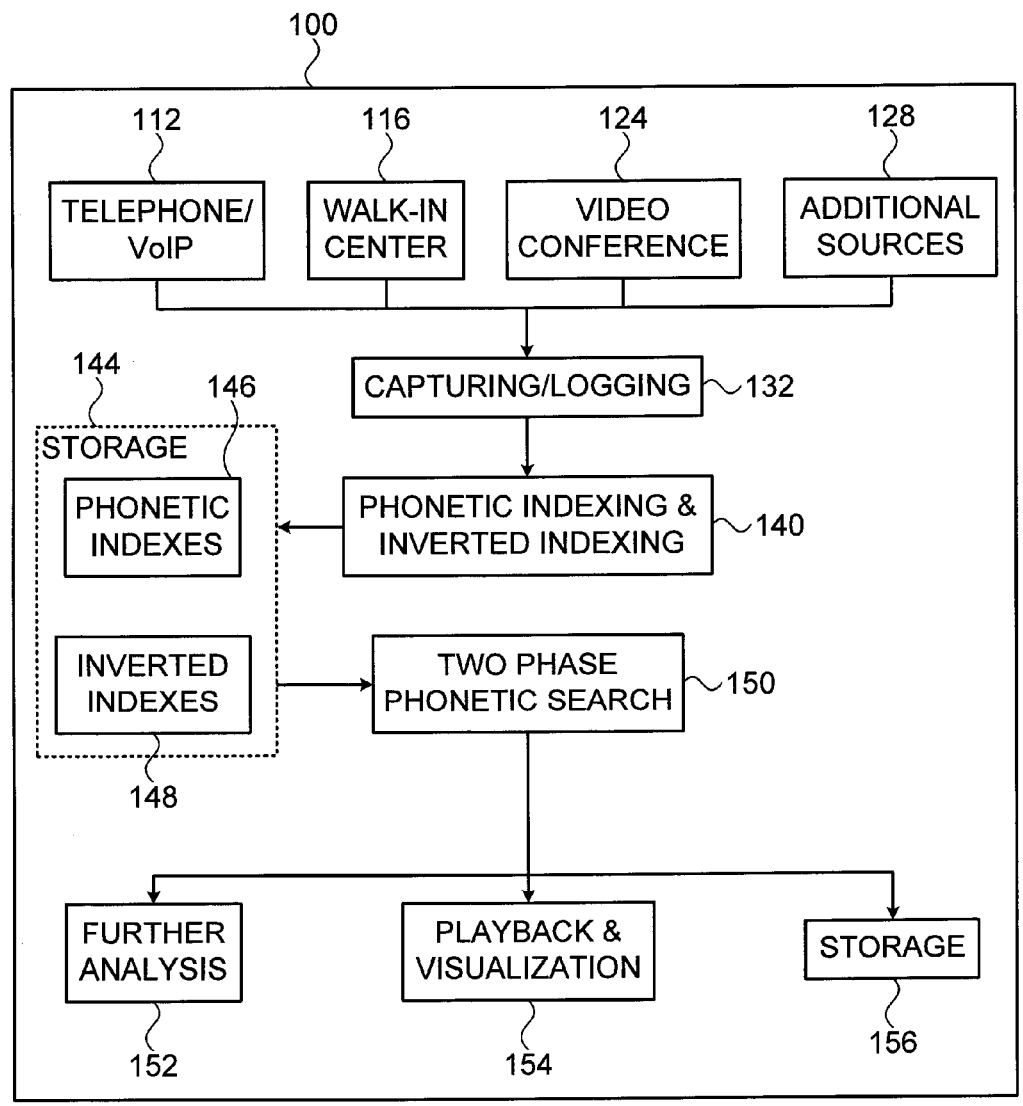
FIG. 1 shows a typical computerized environment in which the disclosed method is used, according to exemplary embodiments of the disclosed subject matter.

Reference is made to FIG. 1 that shows a typical computer-exchange (PABX) or the like may be used in order to capture audio signals. As further shown, the system may include phonetic indexing and inverted indexing component 140, a storage device 144 for storing phonetic indexes 146 and inverted phonetic indexes 148. It also includes a two phase phonetic search component 150. As shown, the output of the system may be provided to further analysis module 152 and/or to playback and visualization module 154 and/or to storage module 156.

A typical environment where a system according to the invention may be deployed may be an interaction-rich organization, e.g., a call center, a bank, a trading floor, an insurance company or any applicable financial or other institute. Other environments may be a public safety contact center, an interception center of a law enforcement organization, a service provider, an internet content delivery company with multimedia search needs, a system for content delivery programs, or the like. Interactions captured and provided to system 100 may be any applicable interactions or transmissions, including broadcasts, interactions with customers or users or interactions involving organization members, suppliers or other parties.

Various data types may be provided as input to system 100. The information types optionally include auditory segments, video segments, textual interactions, and additional data. The capturing of voice interactions, or the vocal or auditory part of other interactions, such as video, may be of any form, format, and may be produced using various technologies, including trunk side, extension side, summed audio, separate audio, various encoding and decoding protocols such as G729, G726, G723.1, and the like. The digital representations of the audio signals of the interactions may be provided by telephone/VoIP module 112, the walk-in center 116, the video conference 124 and additional sources 128 and captured by the capturing and logging module 132. Vocal interactions may include telephone or voice over IP (VoIP) sessions, telephone calls of any kind that may be carried over landline, mobile, satellite phone or other technologies.

It will be appreciated that voice messages are optionally captured and processed as well, and that embodiments of the disclosed subject matter are not limited to two-sided conversations. Captured interactions may include face to-face interactions, such as those recorded in a walk-in-center, video conferences that include an audio component or any additional sources of data as shown by 128. Additional sources 128 may include vocal sources such as microphone, intercom, vocal input by external systems, broadcasts, files, streams, or any other source.

Data from all the above-mentioned sources and others may be captured and/or logged by the capturing and logging module 132. The capturing and logging module 132 may include a computing platform that may execute one or more computer applications, e.g., as detailed below. The captured data may optionally be stored in storage which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization.

Phonetic indexing and inverted indexing component 140 may produce phonetic index and inverted index for each interaction. The phonetic index is a sequence of phonemes representing the speech sounds of the interaction. The inverted index is a data structure that maps between subsequences of the phonetic index and the location they appear in. The location includes the audio signal unique identifier and the time tag in milliseconds within the audio signal. The inverted index data structure enables fast searching of phoneme sequences.

The storage device 144 may store the phonetic indexes 146, and the inverted phonetic indexes 148 of audio interactions, that are produced by the inverted indexing component 140.

Two phase phonetic search component 150 may use inverted phonetic indexes 148 and/or phonetic indexes 146. The inverted indexes are used for first phase search of search terms. The first phase search is a fast course. The first phase search results are ranked. The ranked output of this first phase search may be used as input to a second phase search or used as is, without performing a second phase search. The second phase search may be performed on the top ranked interactions. The second phase search is a phonetic search that is performed using phonetic indexes 146. The top ranked interactions may be selected by using a predefined threshold or selecting the N top ranked interactions or by a combination of threshold selection with limiting the number of selected interactions, in order to bound search time.

The output of the two phase phonetic search component 150 may preferably be sent to further analysis module 152. Further analysis may include, but is not limited to, emotion detection, speech to text, text analysis on the resulting text, call flow analysis, root cause analysis, link analysis, topic extraction, categorization, clustering, or the like. The further analysis may be based on the search results, for example, categorization process may use words or phrases that were detected by the two phase phonetic search component 150 for categorizing interactions.

The output of the two phase phonetic search component 150 may also be transferred to the playback and visualization module 154, if required. The search results can also be presented in any way the user prefers, including for example various graphic representations, textual presentation, table presentation, vocal representation, or the like, and can be transferred in any required method. The output can also be presented as a dedicated user interface or media player that provides the ability to examine and listen to certain areas of the interactions, for example: areas that include detected search results.

The output of the two phase phonetic search component 150 may also be transferred to the storage module 156 for storing search results. Search results storage may include the detected search term, the audio signal in which the term was detected, the time tag of the detected term within the audio signal and the certainty score of the detected search term.

System 100 may include one or more collections of computer instructions, such as libraries, executables, modules, or the like, programmed in any programming language such as C, C++, C#, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
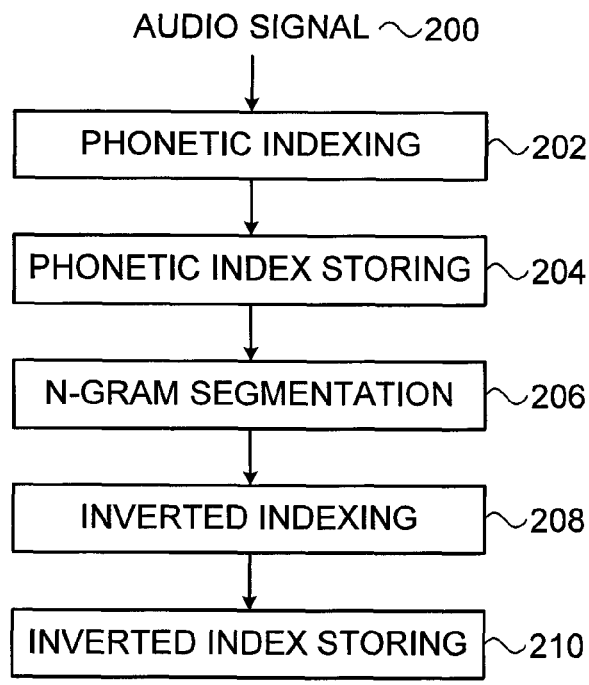
FIG. 2 shows a method for two phase phonetic indexing in which the disclosed method is used, according to exemplary embodiments of the disclosed subject matter.

Reference is made to FIG. 2 which shows an exemplary method according to embodiments of the disclosed subject matter. The method described herein with reference to FIG. 2 may be used for two phase phonetic indexing.

Audio signal 200 contains a digital representation of an audio signal and an audio signal ID. The audio signal ID is a unique identifier of the audio signal. The audio signal is captured and logged by capturing and logging module 132 of FIG. 1.

Step 202 discloses applying phonetic indexing algorithm on the audio signal 200. The audio is phonetically indexed, producing a sequence of pairs, where each pair includes a phoneme and its time tag. The phoneme is the smallest unit of sound of the spoken language. The time tag reflects the time, in milliseconds, from the beginning of the audio signal. The sequence of pairs is referred to herein as phonetic index. Following is a phonetic index example: {[(Ph(1),T(1)], [Ph (2),T(2)] [Ph(3),T(3)], [Ph(4),T(4)] . . . [Ph(n),T(n)]}. Wherein n represents the ordinal number of the phoneme from the beginning of the phonetic index, Ph(n) represents the phoneme type of the nth phoneme and T(n) represent the time interval from the beginning of the audio signal to the beginning of the nth phoneme.

Step 204 discloses storing the phonetic index. The phonetic index is stored in any permanent storage, such as phonetic indexes 146 of storage device 144 of FIG. 1. The stored phonetic index is used on step 318 of FIG. 3 for searching key words or phrases in the audio signal.

Step 206 discloses N-gram segmentation of the phonetic index. The phonetic index is segmented to non-overlapping or overlapping sequences of N consecutive phonemes. The sequence of N consecutive phonemes is referred to herein as phonetic N-gram. A sequence of phonetic N-grams is referred to herein as phonetic N-gram sequence. The number of consecutive phonemes in a phonetic N-gram is referred to herein as N-gram length and the overlap value is referred to herein as N-gram overlap. N-gram length is typically in the range of two to five and N-gram overlap is typically in the range of zero to two, when zero stands for no overlap. For example, for N-gram length of three phonemes and N-gram overlap of zero phonemes, the following phonetic N-gram sequence is generated: {[Ph(1) Ph(2) Ph(3), T(1)], [Ph(4) Ph(5) Ph(6), T(4)] . . . [Ph(n-5) Ph(n-4) Ph(n-3), T(n-5)], [Ph(n-2) Ph(n-1) Ph(n), T(n-2)]}. Another phonetic N-gram sequence example is shown for N-gram length of three phonemes and N-gram overlap of two phonemes: {[Ph(1) Ph(2) Ph(3), T(1)], [Ph(2) Ph(3) Ph(4), T(2)] . . . [Ph(n-3) Ph(n-2) Ph(n-1), T(n-3)], [Ph(n-2) Ph(n-1) Ph(n), T(n-2)]}.

Wherein n represents the ordinal number of the phoneme from the beginning of the phonetic index, Ph(n) represents the phoneme type of the nth phoneme and T(n) represent the time interval from the beginning of the audio signal to the beginning of the n'th phoneme.

Step 208 discloses inverted indexing of the phonetic N-gram sequence. The phonetic N-gram sequence is inversely indexed. The inverted index is a data structure that maps each phonetic N-gram, of the phonetic N-gram sequence, to the audio signal ID that it appears in, the time tag, counted in milliseconds from the beginning of the audio signal and its ordinal position within the phonetic N-gram sequence.

Step 210 discloses inverted index storing. The inverted index is stored along with its audio signal ID in any permanent storage, such as inverted phonetic indexes 148 of storage device 144 of FIG. 1. The stored inverted index is used by the inverted index search disclosed in step 308 of FIG. 3. for inverted index searching.

Figure 3:
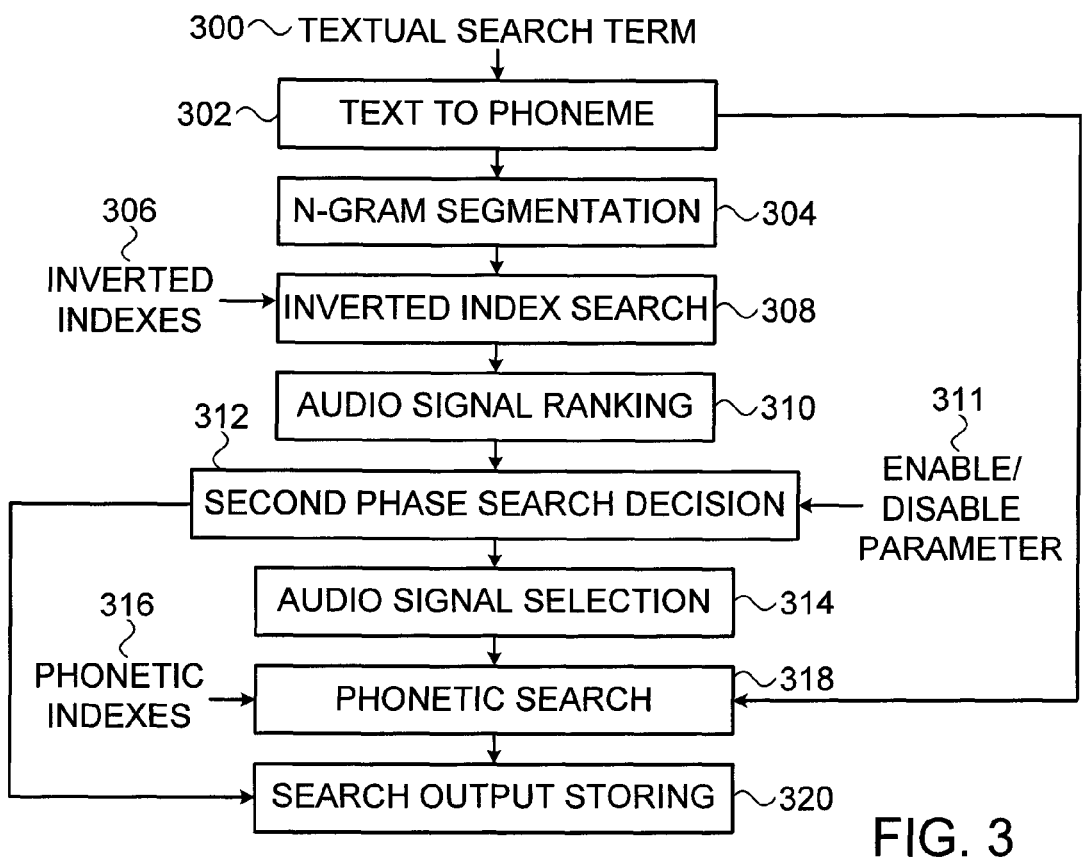
FIG. 3 shows a method for two phase phonetic search in which the disclosed method is used, according to exemplary embodiments of the disclosed subject matter.

Reference is made to FIG. 3 which shows an exemplary method according to embodiments of the disclosed subject matter. The method described herein with reference to FIG. 3 may be used for two phase phonetic search.

Textual search term 300, is an obtained textual form of a word or sequence of words.

Step 302 discloses text to phoneme conversion on the textual search term 300. The textual search term is going through a process of assigning a phonetic transcription to each word within the term, thus generating a sequence of phonemes which is the phonetic representation of the textual search term. The phonetic representation of the textual search term is referred to herein as phonetic search term.

Following is an example of the phonetic search term structure: {Ph(1) Ph(2) Ph(3) Ph(4) . . . Ph(n)}. Wherein n represents the ordinal number of the phoneme from the beginning of the phonetic search term and Ph(n) represents the phoneme type of the nth phoneme. The conversion may be preformed by dictionary based methods. Those methods include dictionaries containing all the words of a language, in textual forms, and their correct pronunciations, in a phoneme sequence form. Step 304 discloses applying N-gram segmentation on the phonetic search term. The phonetic search term is segmented to non-overlapping or overlapping sequences of N consecutive phonemes producing segmented phonetic search terms. The value of N is the same value as the N-gram length value that is used in step 206 of FIG. 2 and the overlap value is the same value as the N-gram overlap value that is used in step 206 of FIG. 2. For example, for N equals three and overlap value of zero the following segmented phonetic search terms are generated: {[Ph(1) Ph(2) Ph(3), T(1)], [Ph(4) Ph(5) Ph(6), T(4)] . . . [Ph(n-5) Ph(n-4) Ph(n-3), T(n-5)], [Ph(n-2) Ph(n-1) Ph(n), T(n-2)]}. Wherein n represents the ordinal number of the phoneme from the beginning of the phonetic search term, Ph(n) represents the phoneme type of the nth phoneme and [Ph(n-2) Ph(n-1) Ph(n)] is a segmented phonetic search term. In addition, a search query is generated. The search query may be generated by applying query operators on the segmented phonetic search terms. For example, the following search query may be generated: {[Ph(1) Ph(2) Ph(3)] NEAR(m) [Ph(4) Ph(5) Ph(6)] NEAR(m) . . . NEAR (m) [Ph(n-5) Ph(n-4) Ph(n-3) NEAR(m) [Ph(n-2) Ph(n-1) Ph(n)]}. Where NEAR(m) is a truth value operator. It produces a "true" value in case that its arguments are found within the range of m ordinal positions, else it produces a "false" value.

Step 308 discloses inverted index search. Inverted index search includes the detection of matches between one or more segmented phonetic search terms that are included in the search query and areas in the inverted index or inverted indexes 306 that are generated on step 208 and stored on step 210 of FIG. 2. Each detected segmented phonetic search term is scored. In some embodiments the scoring may be based on exact matching. In other embodiments the scoring may be based on a distance measure between the segmented phonetic search term and the corresponding inverted index area. The distance may be produced by measuring the phonetic distance between the phoneme sequences. Along with the score, the ordinal position of each detected segmented phonetic search term, in the inverted index and the time tag, counted in milliseconds from the beginning of the audio signal are extracted from the inverted index. The ordinal position, time tag and score are referred to herein as detected event. The output of this step is a list of detected events.

Step 310 discloses audio signal ranking. The audio signal ranking involves receiving two or more audio signal ID's that represent digital representations of audio signals, receiving a list of detected events per audio signal ID, receiving a search query that include one or more segmented phonetic search terms; and ranking the two or more digital representations of audio signals based on the matching between the search query and the detected events.

The ranking process produces a ranked list of audio signal IDs that correspond to audio signals. Audio signal ranking may be based on the number of detected events, their confidence scores and their matching level to the search query. The rank reflects the probability that the textual search term is found within the audio signal. The rank of each audio signal is in the range of 0-100, where 100 represents high probability and 0 represents low probability, that the search term is found within the audio signal. In some embodiments the rank may be produced by counting the number of detected events in an audio signal that satisfy the query. In addition to counting the detected events, their scores can also affect the ranking. For example, the following function may be used for ranking of an audio signal:

$$Rank_j = 100 * \left(1 - a * \log_2\left(1 + \frac{1}{\sum_{i=0}^{N-1} C_i}\right)\right)$$

Where:
J is the audio signal ID;
$C_i$ is the confidence score of i-th detected event within the J-th signal ID;
N is the number of detected events within the J-th signal ID that conform with the search query; and
A is a predetermined constant (may be 0.35 by default, or may be empirically determined through statistical experiments. Other values may be used.); For example, assuming that an audio signal j includes the following 3 detected events that conform with the search query, with the following 3 detected events confidence scores: $C_0=0.6$; $C_1=0.75$; $C_2=0.8$; and assuming that a=0.35. The rank may be calculated as follows:

$$Rank_j = 100 * \left(1 - 0.35 * \log_2\left(1 + \frac{1}{0.6 + 0.75 + 0.8}\right)\right) \approx 81$$

Step 312 discloses second phase search decision. A decision regarding whether to perform phonetic search, in addition to the inverted index search, is made. Performing phonetic search on top of the inverted index search output may yield more accurate search results but slower search speed than performing inverted index search only.

The decision whether to perform further search may be based on obtaining an enable/disable parameter 311. The enable/disable parameter 311 enables or disables the second phase search process. The parameter may be manually controlled by a system user thus enabling the control over the tradeoff between search speed and search accuracy. The decision may also be based on the estimated accuracy of the inverted index search. The accuracy estimation of the inverted index search may be based on audio signal ranking disclosed on step 310. In some embodiments if the average rank of the top N audio signals is above a predefined threshold than second phase search is disabled, else second phase search is enabled, thus performing phonetic search only if the accuracy estimation of the inverted index search is lower than the threshold. The decision may also be based on the available processing resources of the system. In some embodiments performing phonetic search is disabled if the processing resources are below a predefined threshold.

Step 314 discloses audio signal selection. The selection process selects the audio signals that will undergo phonetic search at step 318. The selection process may be based on comparing the rank of each audio signal to a threshold. Audio signals with rank score that is higher than the threshold may undergo phonetic search and Audio signals with rank score that is lower than the threshold may not be searched. In some embodiments the threshold may be predefined (e.g. threshold=50). In other embodiments audio signal selection may be based on selecting the N top ranked audio signals or on a combination of threshold based selection with limitation of the number of selected audio signals, in order to bound search time. Limiting the number of audio signals that are used for phonetic search may be performed according to a predefined limitation parameter obtained by the system of the subject matter.

Step 318 discloses phonetic search. The phonetic search term is searched over phonetic indexes 316 that are generated on step 202 and stored on step 204 of FIG. 2. In some embodiments the search process may be based on a dynamic programming algorithm such as, Viterbi algorithm in order to find sections within the phonetic Index that match the phonetic search term. Similarly to step 308, step 318 produces a list of detected events in its output.

Step 320 discloses search output storing. The search output is generated by the inverted index search step 308 or by the phonetic search step 318. The search output is a list of detected events. Each entry of the detected events list includes three parameters. The first parameter is the audio signal ID that the event was detected in. The second parameter is the time tag of the detected event, within the audio signal and the third parameter is the certainty score of the detected event.

Figures 4A, 4B:
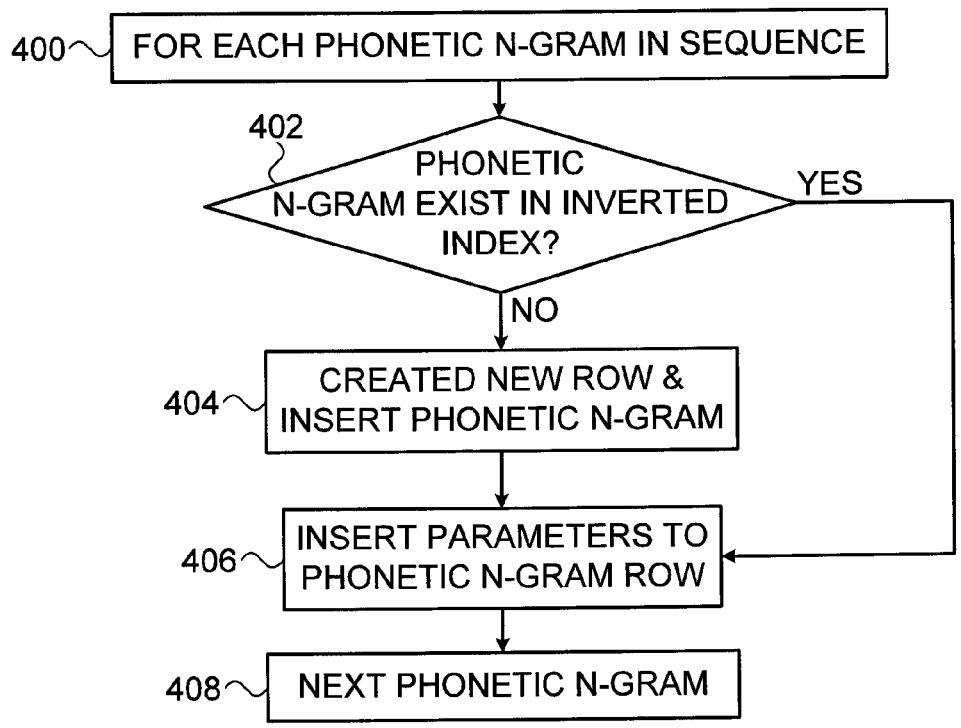
FIG. 4A shows an exemplary method of the inverted indexing process according to embodiments of the disclosed subject matter.
FIG. 4B shows exemplary illustration of the inverted index data structure according to embodiments of the disclosed subject matter.

Reference is made to FIG. 4A which shows an exemplary method of the inverted indexing process according to embodiments of the disclosed subject matter. FIG. 4A may represent the inverted indexing process indicated at step 208 of FIG. 2.

As indicated at step 400, the inverted indexing process is performed for each phonetic N-gram of the phonetic N-gram sequence that is generated by step 206 of FIG. 2. As indicated at step 402, the phonetic N-gram existence in the inverted index is checked. If the phonetic N-gram does not exist then, as indicated in step 404, a new row is created in the inverted index and the phonetic N-gram is inserted into the first cell of the newly created row. If the phonetic N-gram already exists in the inverted index then step 404 is skipped. As indicated in step 406, the following N-gram parameters are inserted to the inverted index data structure in the N-gram row: the audio signal ID that the N-gram appears in, the time tag within this audio signal ID and the ordinal position within the phonetic N-gram sequence related to the audio signal ID. As indicated in step 408 process 402-406 repeats for every phonetic N-gram in the phonetic N-gram sequence.

Reference is made to FIG. 4B which shows an exemplary illustration of the inverted index data structure according to embodiments of the disclosed subject matter. The inverted index is generated on step 208 and stored on step 210 of FIG. 2. The inverted index data structure may include Phonetic N-gram column 420. The Phonetic N-gram column 420 includes all of the different N-gram permutations that appear in the audio signals that are indexed on step 202 and stored on step 204 of FIG. 2. The different permutations are represented here by phonetic N-grams 422, 424, 426 and 428. Each one of those fields is a sequence of N phonemes that appear at least once in the indexed audio signals. For N equals three, the phonetic N-grams 422, 424, 426 and 428 are sequences of three phonemes, For example, N-gram 422 consists of the three consecutive phonemes Ph5, Ph2 and Ph8. Columns 430, 440 and 450 show a mapping of phonetic N-grams 422-428 to the audio signal IDs, the time tags within the audio signal IDs they appear in and the ordinal position within the phonetic N-gram sequence related to the audio signal IDs. For example, N-gram 422 is located 1500 milliseconds from the beginning of audio signal ID 101 and in ordinal position 3 of the phonetic N-gram sequence of audio signal ID 101.

Figure 5A:
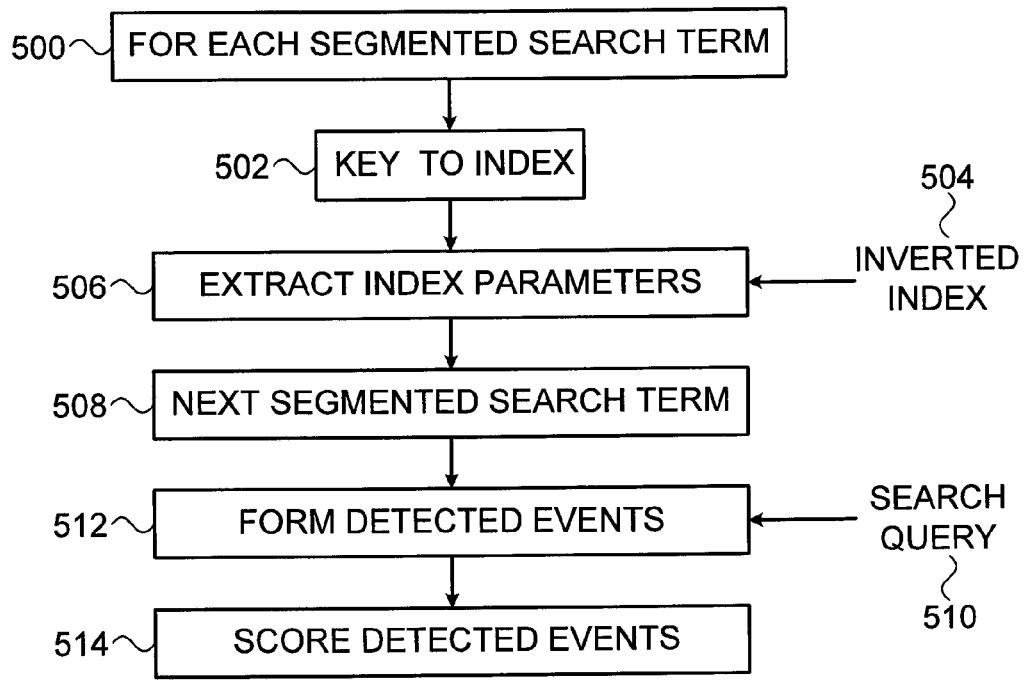
FIG. 5A shows an exemplary method of the inverted index search process according to embodiments of the disclosed subject matter.

Reference is made to FIG. 5A which shows an exemplary method of the inverted index search process according to embodiments of the disclosed subject matter. FIG. 5A may represent the inverted index search process indicated at step 308 of FIG. 3. As indicated in step 500, the inverted index search process is performed for each segmented search term that is produced on step 304 of FIG. 3. The inverted index is generated by step 208 of FIG. 2. As indicated in step 502, a key to index function is performed on the segmented search term thus generating an index value. The index value points to the location, in the inverted index, of the parameters that are mapped to the segmented search term. In some embodiments the key to index function may be based on a hash function or other known in the art functions. The mapped parameters may include the audio signal IDs that the segmented search term appears in the parameters may also include, for each audio signal ID, the time tags within the audio signal ID that the segmented search term appears in and the ordinal position within the phonetic N-gram sequence, related to the audio signal ID. As indicated in step 506, the said parameters are extracted from inverted index, 504. As indicated in step 508, steps 502-506 repeat for every segmented search term. As indicated in step 512, detected events are formed. Detected events are formed by applying search query 510 on the extracted index parameters of the segmented search terms. The search query is generated on step 304 of FIG. 3. Applying the search query may be performed by meeting all or some of the conditions of search query. As indicated in step 512, each detected event is scored. Scoring may be based on the number of search query conditions that are met. For example, consider the following search query: {Term1 NEAR(2) Term2 NEAR(2) Term3}. Consider, for example, a first case where Term1 is found within 2 ordinal positions of Term2 and Term3 is not found within 2 ordinal positions of T2. In this case only one condition is met. Consider, for example, a second case where Term1 is found within 2 ordinal positions of Term2 and Term3 is also found within 2 ordinal positions of T2. In this second case two conditions are met. In this example, the detected event score in the second case is higher than the detected event score in the first case. In some embodiments, the following function may be used for scoring a detected event:

$$\text{Score} = 100 * \left(1 - a * \log_2\left(1 + \frac{1}{N}\right)\right)$$

Figure 5B:
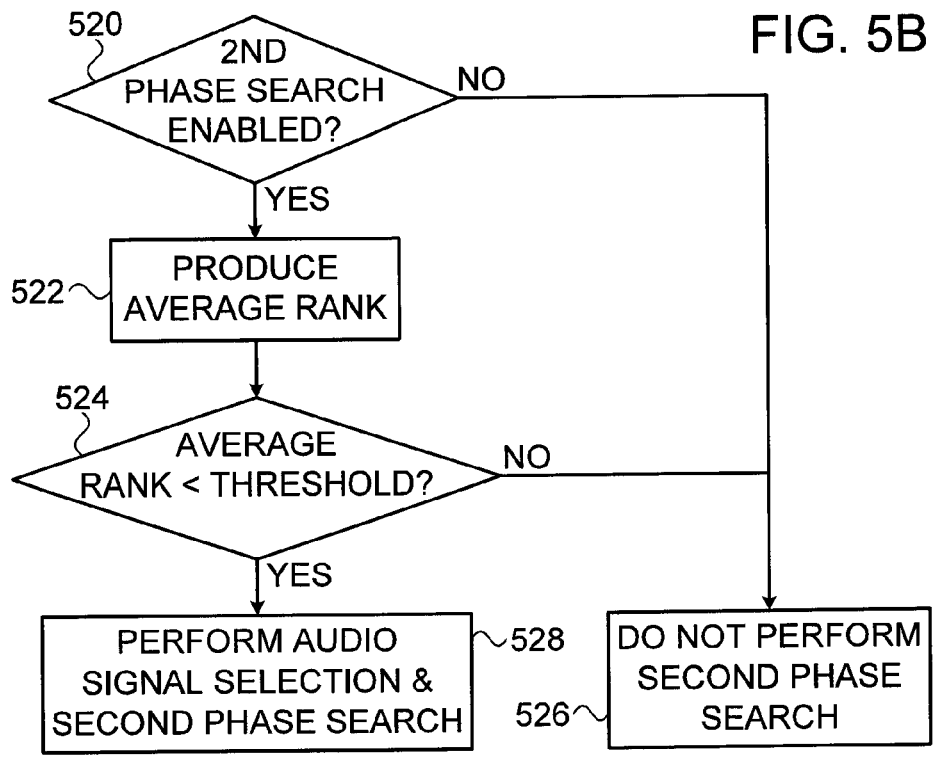
FIG. 5B shows an exemplary method of the second phase search decision process according to embodiments of the disclosed subject matter.

Where:
N is the number of met conditions and:
A is a predetermined constant (may be 0.35 by default, or may be empirically determined through statistical experiments. Other values may be used.);

Reference is made to FIG. 5B which shows an exemplary method of the second phase search decision process according to embodiments of the disclosed subject matter. FIG. 5B may represent the second phase search decision process indicated at step 312 of FIG. 3. As indicated in step 520, the enablement of second phase search process is checked. If the second phase search process is disabled, then, as indicated in step 526, no further search is performed and the process exits. As indicated in step 522 if the second phase search process is enabled then the average rank may be produced. Audio signal ranking is performed on step 310 of FIG. 3. The average rank may be based on all ranked audio signals or on the N top ranked audio signals, where N is typically in the range of 10-100. As indicated in step 524, the average rank is compared against a predefined threshold. If the average rank is higher than the threshold then, as indicated in step 526, no further search is performed and the process exits. If the average rank is lower than the threshold, then, as indicated in step 528, audio signal selection and second phase search are performed by steps 314-318 of FIG. 3.

Figure 5C:
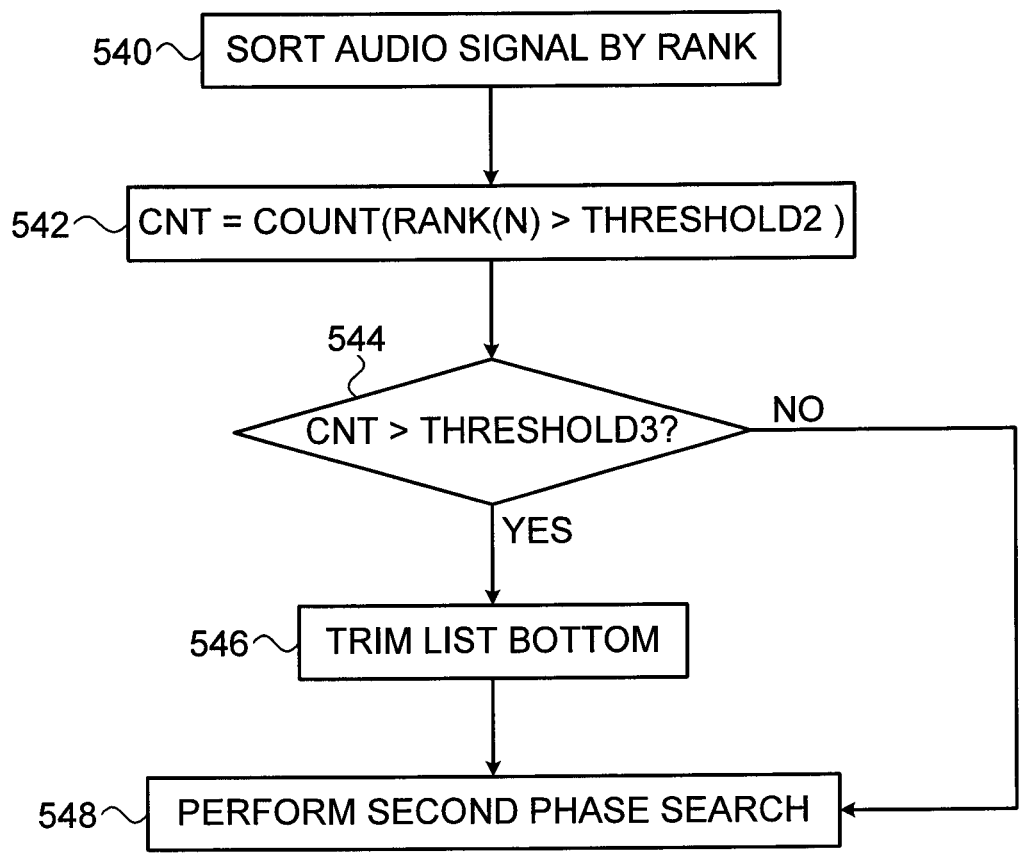
FIG. 5C shows an exemplary method of the audio signal selection process according to embodiments of the disclosed subject matter.

Reference is made to FIG. 5C which shows an exemplary method of the audio signal selection process according to embodiments of the disclosed subject matter. FIG. 5C may represent the audio signal selection process as indicated at step 314 of FIG. 3. As indicated in step 540, the audio signals are sorted, in a descending order by their rank. Audio signals ranking is performed by step 310 of FIG. 3. As indicated in step 542, the number of audio signals that are associated with a rank that is higher then a second threshold is produced. As indicated in step 544, this number is compared against a third threshold. This threshold limits the maximum number of integrations that can be selected for performing a second phase search. If the number of audio signals on the list is lower than the third threshold then, as indicated in step 548, a second phase search is performed by step 318 of FIG. 3. If the number of audio signals on the list is higher then the third threshold then, as indicated in step 546, the bottom of the sorted audio signals list is discarded, thus producing an audio signals list of the maximum length that consist of the top ranked audio signals. As indicated in step 548, a second phase search is performed. The second phase search is performed by step 318 of FIG. 3.

What is claimed is:

1. A method comprising:
   receiving digital representations of audio signals, wherein the audio signals are produced by a suitable device;
   producing phonetic indexes of the audio signals based on said digital representations thereof;
   producing phonetic N-gram sequences from the phonetic indexes by segmenting the phonetic indexes into a plurality of phonetic N-grams;
   producing inverted indexes of the plurality of phonetic N-grams;
   obtaining a textual search term;
   converting the textual search term into a phonetic search term;
   searching the phonetic search term on the inverted indexes;
   ranking the digital representations of the audio signals based on matching between the search query and detected events of the search in the inverted indexes such that a rank reflects the probability that the textual search term is found within any of the audio signals,
   wherein the ranking is according to the following formula:

$$\text{Rank}_j = 100 * \left(1 - a * \log_2\left(1 + \frac{1}{\sum_{i=0}^{N-1} C_i}\right)\right)$$

where the rank is the rank level, j denotes the audio signal, Cj is the confidence score of i-th detected event that satisfy a query in the j-th signal, N is the number of detected events within the j-th signal that satisfy the search query, and a is a constant; and based on the ranking, determining whether or not to automatically perform on each signal of the audio signals a second slower and more accurate phonetic search based on non-inverted indexing, in case a determination to perform the second search is satisfied then the second slower and more accurate phonetic search based on non-inverted indexing is carried out;

responsive to performing the second slower and more accurate search, determining search results with respect to the textual search term; and playing back, via a media player, the search results with respect to said digital representations of the audio signals.

2. The method according to claim 1, wherein the plurality of phonetic N-grams are of the same N-gram length.

3. The method according to claim 1, further comprises producing one or more segmented phonetic search terms from the phonetic search term, the segmented phonetic search terms having the same N-gram length as the plurality of phonetic N-grams;

producing a search query from the one or more segmented phonetic search terms; and searching the search query on the inverted index.

4. The method according to claim 1, wherein the plurality of phonetic N-grams are of variable lengths.

5. The method according to claim 1, further comprises obtaining a limitation parameter; and limiting the number of audio signals that are used for phonetic search according to the limitation parameter.

6. The method according to claim 1, further comprises determining whether to perform a phonetic search according to an accuracy estimation of the inverted index search.

7. The method according to claim 1, further comprises determining whether to perform, a phonetic search according to the available processing resources of a device performing the search.

8. The method according to claim 1, further comprises obtaining an enable/disable parameter; and determining whether to perform a phonetic search according to the enable/disable parameter.

9. The method according to claim 1, further comprises storing search results of the inverted index in a storage device.

10. The method according to claim 1, wherein segmenting the phonetic index into a plurality of phonetic N-grams comprises segmenting the phonetic index to sequences of consecutive phonemes with an overlap of a whole number of phonemes between the sequences.

11. The method according to claim 10, wherein the whole number is zero, hence the plurality of phonetic N-grams do not overlap.

12. The method according to claim 10, wherein the whole number is non-zero, hence the plurality of phonetic N-grams overlap therebetween.

13. The method according to claim 1, wherein the second search would be performed only on audio signals that have a rank that is higher than a given threshold.

14. The method according to claim 1, wherein determining whether or not to perform the second search is according to an accuracy estimation of the search based on inverted indexes.

15. The method according to claim 1: wherein determining whether or not to perform the second search is according to load balance of the computerized apparatus performing the phonetic search.

16. The method according to claim 1, wherein a is empirically determined.

* * * * *